US010846924B2

(12) United States Patent
Shore

(10) Patent No.: US 10,846,924 B2
(45) Date of Patent: Nov. 24, 2020

(54) THREAT SOURCE MAPPING SYSTEMS AND METHODS

(71) Applicant: FLIR Detection, Inc., Stillwater, OK (US)

(72) Inventor: Anthony Paul Shore, Stillwater, OK (US)

(73) Assignee: FLIR DETECTION, INC., Stillwater, OK (US)

( * ) Notice: Subject to any disclaimer, the term of this patent is extended or adjusted under 35 U.S.C. 154(b) by 0 days.

(21) Appl. No.: 16/374,308

(22) Filed: Apr. 3, 2019

(65) Prior Publication Data
US 2019/0311534 A1 Oct. 10, 2019

Related U.S. Application Data

(60) Provisional application No. 62/652,657, filed on Apr. 4, 2018.

(51) Int. Cl.
| G06T 17/05 | (2011.01) |
| H04L 29/08 | (2006.01) |
| G06T 7/246 | (2017.01) |
| G01T 1/20 | (2006.01) |
| G06T 15/50 | (2011.01) |

(52) U.S. Cl.
CPC ............ *G06T 17/05* (2013.01); *G01T 1/20* (2013.01); *G06T 7/246* (2017.01); *G06T 15/50* (2013.01); *H04L 67/12* (2013.01); *G06T 2200/04* (2013.01); *G06T 2207/30196* (2013.01)

(58) Field of Classification Search
None
See application file for complete search history.

(56) References Cited

U.S. PATENT DOCUMENTS

| 5,140,416 A | 8/1992 | Tinkler |
| 5,488,674 A | 1/1996 | Burt et al. |
| 9,123,220 B2 * | 9/2015 | Icove ............... G01K 11/006 |
| 9,471,970 B2 | 10/2016 | Strandmar |

(Continued)

OTHER PUBLICATIONS

Rao et al., "Identification of Low-Level Point Radiation Sources Using a Sensor Network," 2008 International Conference on Information Processing in Sensor Networks, pp. 493-504, St. Louis, MO, 2008.

(Continued)

*Primary Examiner* — YuJang Tswei
(74) *Attorney, Agent, or Firm* — Haynes and Boone, LLP

(57) ABSTRACT

Provided herein are threat source mapping systems and related techniques. A threat source mapping system includes a threat sensor network and a logic device. The threat sensor network includes one or more threat detectors each configured to monitor at least a portion of a scene for at least one threat detection event. The logic device is configured to receive the at least one threat detection event from the threat sensor network, generate a threat source location heat map based, at least in part, on the at least one threat detection event, and generate a threat source image map based, at least in part, on the threat source location heat map and at least one image of the scene that at least partially overlaps the portions of the scene monitored by the one or more threat detectors. The threat source image map may then be displayed to a user.

20 Claims, 7 Drawing Sheets

(56) References Cited

U.S. PATENT DOCUMENTS

2012/0262584 A1* 10/2012 Strandemar ............... G06T 5/50
                                                            348/164
2013/0113939 A1   5/2013 Strandemar
2015/0125065 A1   5/2015 Lee et al.
2016/0217578 A1*  7/2016 Can ........................ G01V 3/12
2018/0075383 A1*  3/2018 Fogel .................... G06T 11/60

OTHER PUBLICATIONS

Chin et al., "Accurate localization of low-level radioactive source under noise and measurement errors", pp. 183-196. 10.1145/1460412.1460431, Computer Science Technical Reports, 2008.

Riley et al., "Low Cost Dept and Radiological Sensor Fusion to Detect Moving Sources," 2015 International Conference on 3D Vision (3DV), Oct. 19-22, 2015.

* cited by examiner

THREAT SOURCE MAPPING SYSTEMS AND METHODS

CROSS REFERENCE TO RELATED APPLICATIONS

This application claims the benefit of and priority to U.S. Provisional Patent Application No. 62/652,657 filed Apr. 4, 2018 and entitled "THREAT SOURCE MAPPING SYSTEMS AND METHODS," which is incorporated herein by reference in its entirety.

TECHNICAL FIELD

The present invention relates generally to threat source mapping and, more particularly, to systems and methods for substantially real time radiological, chemical, biological, and/or other threat source monitoring, tracking, and/or mapping, and related display.

BACKGROUND

Monitoring of public thoroughfares, transportation centers, and other important yet generally accessible to the public areas is commonly done with visible and other spectrum imaging devices/cameras throughout the world. Such monitoring can generally track objects, patterns, and/or individuals as they pass through such areas, but cameras, by themselves, generally can't detect or track hidden or shielded objects or differentiate between the generally plausible threats to such areas, such as radiological, chemical, biological, or other threats to, for example, public thoroughfares. Radiation, chemical, and biological threat detectors exist, but they often fail to localize the source of such threat to extent generally capable by cameras, and the detectors typically require expert operators to interpret their output detection events quickly and accurately. Thus, there is a need in the art for methodologies to reliably map threat sources and display the results in a manner that is easily interpreted and acted upon by non-expert users.

SUMMARY

Threat source mapping systems and related techniques are provided to localize the source of radiological, chemical, biological, physical, and/or other threats to monitored areas substantially in real time. One or more embodiments of the described threat source mapping systems may advantageously include a threat sensor network including multiple threat detectors configured to monitor an area for various types of threats from multiple perspectives substantially simultaneously, and a controller to combine and correlate threat sensor data to localize the source of a detected threat. Such threat detectors may be mobile and may include an orientation sensor, a gyroscope, an accelerometer, and/or a position sensor providing and orientation and/or position of the threat detector. The threat source mapping system may also include one or more visible spectrum and/or infrared cameras, for example, and combine threat detection data from the threat sensor network with imagery to provide an intuitive threat source image map of an estimate of the source of the detected threat, which can evolve over time.

In one embodiment, a system includes a threat sensor network including one or more threat detectors each configured to monitor at least a portion of a scene for at least one threat detection event, and a logic device configured to communicate with the threat sensor network. The logic device may be configured to receive the at least one threat detection event from the threat sensor network, generate a threat source location heat map based, at least in part, on the at least one threat detection event, and generate a threat source image map based, at least in part, on the threat source location heat map and at least one image of the scene that at least partially overlaps the portions of the scene monitored by the one or more threat detectors. Once generated, the threat source image map may be communicated to a display network, which may display the threat source image map to a user in substantially real time.

In another embodiment, a method includes receiving at least one threat detection event from a threat sensor network including one or more threat detectors each configured to monitor at least a portion of a scene for the at least one threat detection event, generating a threat source location heat map based, at least in part, on the at least one threat detection event, and generating a threat source image map based, at least in part, on the threat source location heat map and at least one image of the scene that at least partially overlaps the portions of the scene monitored by the one or more threat detectors.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
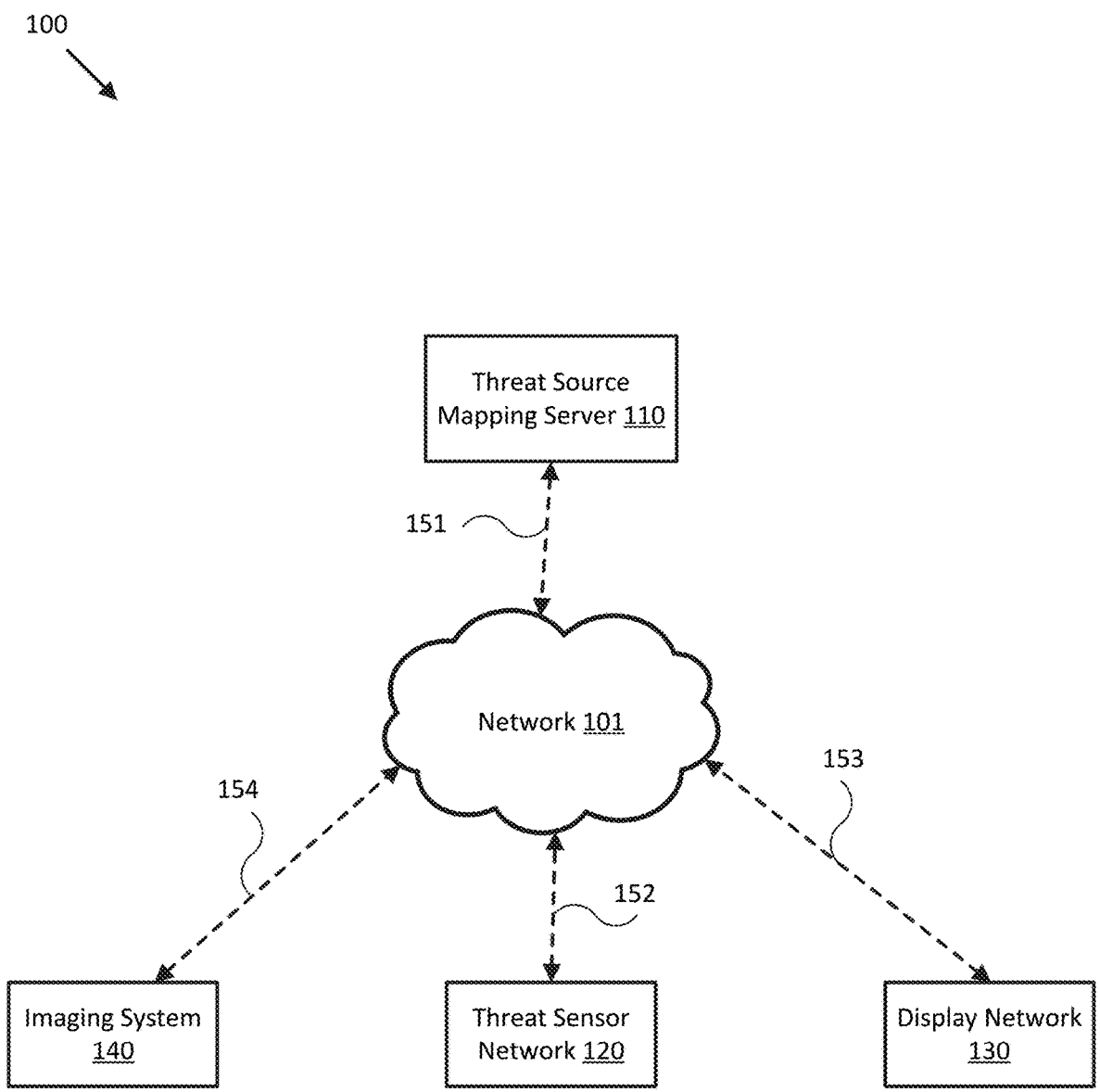
FIG. 1 illustrates a diagram of a threat source mapping system in accordance with an embodiment of the disclosure.

Threat source mapping systems and related techniques are provided to reliably map threat sources and display the results in a manner that is easily interpreted and acted upon by non-expert users. A threat source mapping system may advantageously include a threat sensor network including one or more threat detectors each configured to monitor at least a portion of a scene for at least one threat detection event, and a threat source mapping server configured to combine the threat detector data from the threat sensor network with images of the same scene to provide an intuitive and updating map of the source of a detected threat. The individual threat detectors of the threat sensor network may be mobile and include orientation and/or position sensors to correlate threat detection events with orientations and/or positions of a corresponding threat detector. The threat source mapping system may also include an imaging system with one or more scene imagers configured to provide the images (e.g., visible spectrum, infrared, and/or other spectrums) of the scene monitored by the threat sensor network, and each scene imager may also include orientation and/or position sensors to correlate images with viewpoint positions and/or orientations of the scene imager.

When potential radiological threats are detected, fast localization of the source is critical to any mitigation strategy. While a radiation sensor may be able to orient an operator in the correct general direction, it is often limited in its ability to quickly locate the source. To provide better spatial information, information from multiple radiation or other threat sensors may be fused or combined together by forming a network wherein each threat sensor is communicatively coupled to a central threat source mapping server, such as by a wired or wireless communication link. The threat source mapping server then correlates the threat sensor data, such as by comparing their relative strengths, time histories, and physical locations and/or orientations, to generate a heat map of the likely source location.

As used herein, a heat map may be implemented as a graphical representation of threat detection data where individual values (e.g., threat sensor signal strength, cross section, duration, source identification) associated with areas within the heat map (e.g., pixels, textures, surfaces) are represented as colors, opacity, and/or other graphics characteristics. In various embodiments, a heat map may be implemented as a two dimensional pixel map of a scene, for example, or may be implemented as a three dimensional model of a scene, which may in some embodiments be rendered from a selected viewpoint to generate a two dimensional pixel map of the scene according to the selected viewpoint.

In various embodiments, a threat source location heat map may be a heat map with colors, opacity, and/or other graphics characteristics that indicate the likelihood of a threat source position being at the area within the heat map. For example, a relatively low threat sensor signal generated by an omnidirectional threat sensor might produce a disk (for a two dimensional heat map) or sphere (for a three dimensional heat map) centered on a position of the associated threat detector within the heat map and having a relatively "cool" color or gradient of colors or other graphics characteristics. By contrast, a relatively high threat sensor signal generated by the same threat sensor might produce a disk or sphere within the heat map having a relatively "hot" color or gradient of colors or other graphics characteristics. Overlapping threat detection events (e.g., in time, and/or generated by separate threat detectors) may generate relatively "hot" areas where they overlap by summing the values where they overlap within the heat map (e.g., and the entire heat map may be normalized to substantially maintain a desired dynamic range for the values within the heat map). In general, a threat source location heat map may include one or more estimated threat source positions/threat zones that may be identified by "hotter" hues, saturation values, opacities, or other graphical characteristics and/or identifiers, as described herein.

Once such map is generated, it may be blended or otherwise combined with surveillance video feeds to provide visual indication of the source, and the combined imagery may be made available to any device (e.g., computers, mobile phones, handheld radiation detectors, etc.) tied to the network. In various embodiments, the "resolution" of the generated heat map may be dynamic, getting generally better as the number of threat sensors and/or available time history of the associated detection events allows for tighter estimation and/or localization of the likely source. In additional embodiments, video analytics may be used to detect and add motion tracks of people and vehicles to the correlation threat sensor data set to help further localize and/or estimate the position of the threat source in real time.

In general, embodiments permit faster isolation or localization of various types of threat sources, such as sources of radiation, chemical agents, biological agents, sources of physical threats (e.g., vehicles, personnel, animals), and/or other detectable threats, which helps give personnel better information from which to plan mitigation strategies, such as preventative evacuations, diverting traffic, sequester of the threat, and/or other threat mitigation strategies intended to remove the threat source from the area, to disable the mobility of the threat, to remove the threatened from the area around the threat source, or to otherwise eliminate the risk associated with the threat source. By using a network of threat sensors, embodiments may permit the use of lower cost threat detectors and/or sensors by aggregating the information from multiple threat detectors, such as to compensate for reduced sensitivity due to smaller crystal sizes (e.g., for a radiation sensor). Embodiments may be configured to detect radiological, chemical, biological, and/or other threats suitable for detection via generally autonomous sensors, such as those described herein. Moreover, combinations of different types of threat sensors may be combined within a threat sensor network and/or threat detector, for example, to provide for simultaneous multi-threat monitoring of an area, such as such as simultaneous threat source mapping of a radiological source and an explosive (e.g., a chemical agent/source).

More generally, embodiments include techniques to combine information from various types of threat sensors (e.g., chemical, biological, explosive, radiation, nuclear, radio, lidar, radar, etc.) observing a three dimensional space with images from a camera (e.g., visible light, infrared, etc.) generally observing the same three dimensional space and then displaying the combined images. For example, a threat sensor may observe a three dimensional scene and detect, record, and/or communicate its measured phenomena and/or other information (e.g., a threat detection event). In some embodiments, one or more three dimensional observations may be used to create a three dimensional model where each observation is represented by a three dimensional object. The three dimensional model may include or be implemented by one or more of the following: a simple three dimensional point cloud of three dimensional observations; a three dimensional model where each three dimensional observation is represented as a diffuse three dimensional (generally spherical) object whose hue (H), saturation (S), light (L), value (V), and/or alpha (A, opacity) decreases as a function of distance from the center of the object, varies as a function of the perceived strength of the phenomena, and/or varies as a function of the type of the phenomena (e.g., as a 'foggy' blob with a hue indicating the classification of the radioactive material, a saturation indicating signal strength, and an alpha indicating certainty of location).

In various embodiments, a synthetic image (e.g., a "heat map" or choropleth map) of the three dimensional model may be rendered from the same three dimensional viewpoint as the camera image it is to be combined with using three dimensional model rendering technologies. The synthetic images and camera images may be combined with each other to generate a threat source image map by, for example, combining high frequency content from the visible/camera imagery with the viewpoint-selected rendered three dimensional model of the three dimensional observations, such as by blending, overlay, and/or other image combining techniques, where, for example, at least the high frequency detail content of the camera imagery is retained in the combined image. Similar techniques can be used with two dimensional observations with an assumed Height Above Ground used for the third dimension, for example. Another similar technique can be used with radar track information, where the three dimensional model object's size represents cross-section, its density (alpha opacity) directly represents the track probability density function (e.g., a 3 dimensional ellipse), color represents affiliation, etc.

FIG. 1 illustrates a diagram of a threat source mapping system 100 in accordance with an embodiment of the disclosure. In some embodiments, system 100 may be configured to monitor scene 190 (e.g., a crossroads, a port, and/or other public thoroughfares, generally a three dimensional space) and generate a threat source image map for display to a user and to indicate the position of a source for a threat within scene 190. In the embodiment shown in FIG. 1, threat source mapping system 100 includes threat source mapping server 110, threat sensor network 120, display network 130, and imaging system 140, all communicatively coupled to each other via network 101 and communication links 151-154, as shown. Network 101 and communication links 151-154 may include any combination of wired or wireless communication links, wide area networks, local area networks, and/or other network systems and/or methodologies supporting communication of imagery, threat detection events, display views, control signals, and/or other system parameters among the elements of system 100. In some embodiments, one or more of the elements of system 100 may be implemented in a combined housing or structure that can be coupled to or within scene 190 and/or held or carried by a user of system 100.

In various embodiments, threat sensor network 120 may include a number of individual threat detectors each communicatively coupled to threat source mapping server 110 over network 101, and likewise, display network 130 and imaging system 140 may each include a number of individual displays and scene imagers also communicatively coupled to threat source mapping server 110 over network 101. In general, threat detection events associated with scene 190 and detected by each individual threat detector within threat sensor network 120 are communicated directly to threat source mapping server 110. Upon receiving a threat detection event, threat source mapping server 110 may control imaging system 140 to provide imagery of scene 190, or, alternatively, threat source mapping server 110 may continuously receive imagery of scene 190 and select images of scene 190 that substantially match a time stamp of a threat detection event provided to threat source mapping server 110. Once both a threat detection event and corresponding imagery of scene 190 are received, threat source mapping server 110 may then combine a heat map generated based on the threat detection event with the corresponding imagery to generate a threat source image map, as described herein. If multiple threat detection events are received (e.g., substantially simultaneously, or over a predetermined sample period), threat source mapping server 110 may first generate the heat map based on a combination of the multiple threat detection events, as described herein.

Figure 2:
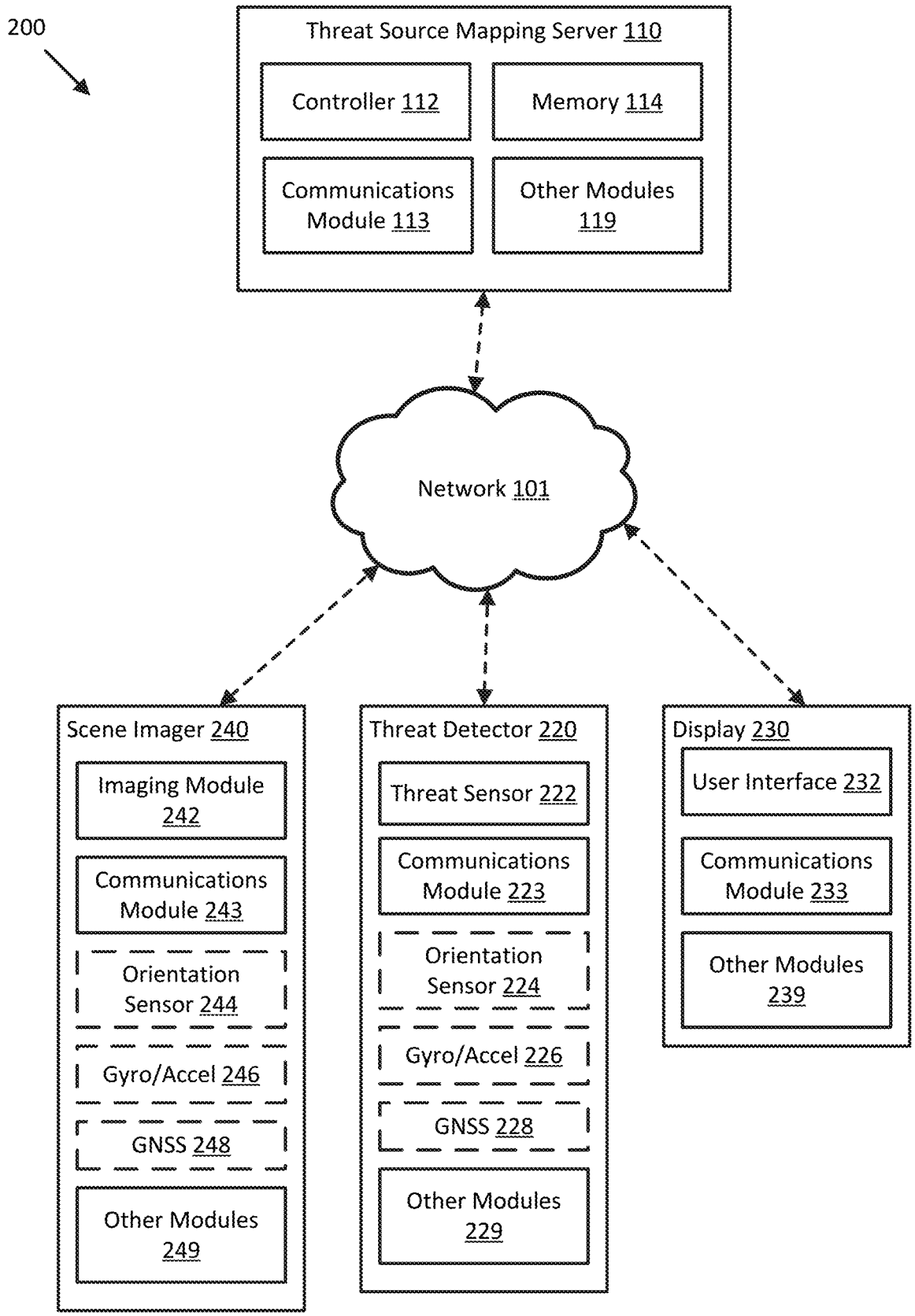
FIG. 2 illustrates a diagram of a threat source mapping system in accordance with an embodiment of the disclosure.

FIG. 2 illustrates a diagram of a threat source mapping system 200 in accordance with an embodiment of the disclosure. System 200 is similar to system 100 of FIG. 1 but shows additional detail as to the individual elements of system 100. For example, as shown in FIG. 2, threat source mapping server 110 includes controller 112, communications module 113, memory 114, and other modules 119.

Controller 112 of threat source mapping server 110 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of threat source mapping server 110 and/or other elements of system 100, for example. Such software instructions may also implement methods for processing images, threat detection events, and/or other sensor signals, determining sensor information, providing user feedback (e.g., through display 230), querying devices for operational parameters, selecting operational parameters for devices, or performing any of the various operations described herein (e.g., operations performed by logic devices of various devices of system 100).

In addition, a non-transitory machine readable medium may be provided for storing instructions for loading into and execution by controller 112. For example, memory 114 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 114 may also be implemented, at least in part, as removable memory, such as a secure digital memory card for example including an interface for such memory.

In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using display 230. In some embodiments, controller 112 may be integrated with one or more other elements of threat source mapping server 110, for example, or distributed as multiple logic devices within threat source mapping server 110 and/or display system 130 of FIG. 1.

Communications module 113 of threat source mapping server 110 may be implemented as any wired and/or wireless communications module configured to transmit and receive analog and/or digital signals between elements of systems 100 or 200. For example, communications module 113 may be configured to receive threat detection events from threat detector 220 of threat sensor network 120, to receive images of scene 190 from scene imager 240 of imaging system 140, and provide them to controller 112 and/or memory 114. In other embodiments, communications module 113 may be configured to provide a threat source image map and/or other imagery to display 230 of display network 130, for example, or to receive user input from display 230 (e.g., provided to user interface 232 of display 230). In some embodiments, communications module 113 may be configured to support spread spectrum transmissions, for example, and/or multiple simultaneous communications channels between elements of system 100.

Other modules 119 of threat source mapping server 110 may include other and/or additional sensors, actuators, communications modules/nodes, and/or user interface devices (e.g., a keyboard, mouse, and/or display/touchscreen), for example, and may be used to provide additional environmental information related to operation of threat source mapping server 110, for example. In some embodiments, other modules 119 may include a humidity sensor, a wind and/or water temperature sensor, a barometer, an altimeter, a radar system, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of threat source mapping server 110 and/or system 100 or to process imagery to compensate for environmental conditions. In some embodiments, other modules 119 may include one or more actuated and/or articulated devices (e.g., multi-spectrum active illuminators, visible and/or IR cameras, radars, sonars, and/or other actuated devices) coupled to threat source mapping server 110, where each actuated device includes one or more actuators adapted to adjust an orientation of the device, relative to threat source mapping server 110, in response to one or more control signals (e.g., provided by controller 112).

Threat detector 220 is one example of a plurality of threat detectors that may form threat sensor network 120 in FIG. 1. As shown in FIG. 2, threat detector 220 includes threat sensor 222, communications module 223, other modules 229, and optionally (e.g., for mobile threat detectors) orientation sensor 224, gyroscope/accelerometer 226, and global navigation satellite system (GNSS) 228. Threat sensor 222 may be a radiation sensor (e.g. an ionizing radiation sensor configured to detect and/or identify radiation sources), a chemical sensor (e.g., an analyte detection system configured to detect and/or identify harmful or potentially harmful chemicals or explosives), a biological sensor (e.g., a biological detection system configured to detect and/or identify harmful biological agents), a physical threat sensor (e.g., a radar or lidar sensor configured to detect and/or identify a physical threat) and/or other threat sensor configured to monitor an area for a threat detection event and to provide the threat detection event to threat source mapping server 110 over network 101 using communications module 223. For example, if implemented as a radiation sensor, threat sensor 222 may include a scintillator detector configured to report a threat detection event when a gamma count rises above a predetermined threshold.

In various embodiments, the threat detection event reported to threat source mapping server 110 may include a variety of associated threat detection data, such as the strength or magnitude of the event (e.g., the rate of radiation events, the magnitude of chemical or biological substance response), the spectrum of the radiation energy, the specific substance generating the threat detection event, the time stamp of the threat detection event, and/or other related data, such as an orientation and/or position of threat detector 220 provided by orientation sensor 224, gyroscope/accelerometer 226, and/or GNSS 228, for example, or environmental sensor data (e.g., other modules 229) indicating environmental conditions affecting sensitivity, gain, and/or other operation of threat detector 220.

Communications module 223 of threat detector 220 may be implemented as any wired and/or wireless communications module configured to transmit and receive analog and/or digital signals between elements of systems 100 or 200. For example, communications module 223 may be configured to transmit threat detection events from threat sensor 222 to threat source mapping sever 110. In other embodiments, communications module 223 may be configured to receive control signals and/or parameters from threat source mapping sever 110, for example, or to receive user input from display 230 (e.g., provided to user interface 232 of display 230). In some embodiments, communications module 223 may be configured to support spread spectrum transmissions, for example, and/or multiple simultaneous communications channels between elements of system 100.

Other modules 229 may include other and/or additional sensors, actuators, communications modules/nodes, and/or user interface devices, for example, and may be used to provide additional environmental information related to operation of threat detector 220, for example. In some embodiments, other modules 229 may include a humidity sensor, a temperature sensor, a barometer, an altimeter, a radar system, a visible spectrum camera or infrared camera (with an additional mount), an irradiance detector, and/or other environmental sensors providing measurements and/or other sensor signals that can be displayed to a user and/or used by other devices of system 200 (e.g., controller 112) to provide operational control of threat source mapping server 110 and/or system 200. In some embodiments, other modules 229 may include one or more actuated and/or articulated devices (e.g., multi-spectrum active illuminators, visible and/or IR cameras, radars, sonars, and/or other actuated devices) coupled to threat detector 220, where each actuated device includes one or more actuators adapted to adjust an orientation of the device, relative to threat detector 220, in response to one or more control signals (e.g., provided by controller 112).

In various embodiments, threat detector 220 may include orientation sensor 224, gyroscope/accelerometer 226, and/or GNSS 228 to provide orientation and/or position data for threat detector 220 (e.g., which may be included in a threat detection event provided to threat source mapping server 110). For example, threat detector 220 may be mobile and/or directional (e.g., generally able to localize a threat source both by presence and by orientation relative to the position of the directional threat detector) and require such sensor data to properly position and orient its sensitivity pattern relative to scene 190 and/or other threat detectors within threat sensor network 120. In other embodiments, threat detector 220 may be stationary and either omit orientation sensor 224, gyroscope/accelerometer 226, and/or GNSS 228 (e.g., thereby relying on an installation or calibration orientation and/or position relative to scene 190), for example, or include only GNSS 228 to provide a reliable position for threat detector 220 to differentiate its threat detection events from those of other threat detectors.

Orientation sensor 224 may be implemented as one or more of a compass, float, accelerometer, and/or other device capable of measuring an orientation of threat detector 220 (e.g., magnitude and direction of roll, pitch, and/or yaw, relative to one or more reference orientations such as gravity and/or Magnetic North), and providing such measurements as sensor signals that may be communicated as part of threat detection events communicated to other devices of system

100. Gyroscope/accelerometer 226 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of threat detector 220 and providing such measurements as sensor signals that may be communicated as part of threat detection events communicated to other devices of system 100 (e.g., user interface 232, controller 112). GNSS 228 may be implemented according to any global navigation satellite system, including a GPS, GLONASS, and/or Galileo based receiver and/or other device capable of determining absolute and/or relative position of threat detector 220 (e.g., or an element of threat detector 220) based on wireless signals received from space-born and/or terrestrial sources (e.g., eLoran, and/or other at least partially terrestrial systems), for example, and capable of providing such measurements as sensor signals that may be communicated as part of threat detection events communicated to other devices of system 100 (e.g., user interface 232, controller 112). In some embodiments, GNSS 228 may include an altimeter, for example, or may be used to provide an absolute altitude.

Display 230 is one example of a plurality of displays that form display network 130 in FIG. 1. As shown in FIG. 2, display 230 includes user interface 232, communications module 233, and other modules 229. User interface 232 of display 230 may be implemented as one or more of a display, a touch screen, a keyboard, a mouse, a joystick, a knob, and/or any other device capable of accepting user input and/or providing feedback to a user. In various embodiments, user interface 232 may be adapted to provide user input (e.g., as a type of signal and/or sensor information transmitted by communications module 233 of display 230) to other devices of systems 100 or 200, such as controller 112. User interface 232 may also be implemented with one or more logic devices (e.g., similar to controller 112) that may be adapted to store and/or execute instructions, such as software instructions, implementing any of the various processes and/or methods described herein. For example, user interface 232 may be adapted to form communication links, transmit and/or receive communications (e.g., visible spectrum and/or infrared images and/or other sensor signals, control signals, sensor information, user input, and/or other information), for example, or to perform various other processes and/or methods described herein.

In one embodiment, user interface 232 may be adapted to display a time series of various sensor information and/or other parameters as part of or overlaid on a graph or map, which may be referenced to a position and/or orientation of other elements of system 100. For example, user interface 232 may be adapted to display a time series of threat source image maps, positions, headings, and/or orientations of threat detector 220 and/or scene imager 240, and/or other elements of system 100 overlaid on a geographical map, which may include one or more graphs indicating a corresponding time series of actuator control signals, sensor information, and/or other sensor and/or control signals. In some embodiments, user interface 232 may be adapted to accept user input modifying a control loop parameter of controller 112, for example. In further embodiments, user interface 232 may be adapted to accept user input including a user-defined target attitude, orientation, and/or position for an actuated or articulated device (e.g., scene imager 240) associated with threat source mapping systems 100 or 200, for example, and to generate control signals for adjusting an orientation and/or position of the actuated device according to the target attitude, orientation, and/or position.

Communications module 233 of display 230 may be implemented as any wired and/or wireless communications module configured to transmit and receive analog and/or digital signals between elements of systems 100 or 200. For example, communications module 233 may be configured to receive threat source image maps from threat source mapping sever 110. In other embodiments, communications module 233 may be configured to provide control signals and/or parameters from user input provided to user interface 232 to other devices of systems 100 or 200. In some embodiments, communications module 233 may be configured to support spread spectrum transmissions, for example, and/or multiple simultaneous communications channels between elements of system 100.

Other modules 239 may include other and/or additional sensors, actuators, communications modules/nodes, and/or user interface devices, for example, and may be used to provide additional environmental information related to operation of display 230, for example. In some embodiments, other modules 239 may include a humidity sensor, a temperature sensor, a barometer, an altimeter, a radar system, a visible spectrum camera or infrared camera (with an additional mount), an irradiance detector, and/or other environmental sensors providing measurements and/or other sensor signals that can be displayed to a user and/or used by other devices of system 200 (e.g., controller 112) to provide operational control of threat source mapping server 110 and/or system 200. In some embodiments, other modules 239 may include orientation and/or position sensors configured to provide an orientation and/or position of display 230 relative to scene 190 and/or other elements of systems 100 or 200.

Scene imager 240 is one example of a plurality of scene imagers that form imaging system 140 in FIG. 1. As shown in FIG. 2, scene imager 240 includes imaging module 242, communications module 243, other modules 249, and optionally (e.g., for mobile scene imagers/smart phones) orientation sensor 244, gyroscope/accelerometer 246, and GNSS 248. Imaging module 242 may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 242 may include one or more logic devices (e.g., similar to controller 112) that can be configured to process imagery captured by detector elements of imaging module 242 before providing the imagery to communications module 243. More generally, imaging module 242 may be configured to perform any of the operations or methods described herein, at least in part, or in combination with controller 112 and/or user interface 232.

In some embodiments, scene imager 240 may be implemented with a second or additional imaging modules similar to imaging module 242, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 242 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 243 of scene imager 240 may be implemented as any wired and/or wireless communications module configured to transmit and receive analog and/or digital signals between elements of systems 100 or 200. For example, communications module 243 may be configured to transmit images captured by imaging module 242 to threat source mapping sever 110. In other embodiments, communications module 243 may be configured to receive control signals and/or parameters from threat source mapping sever 110, for example, or to receive user input from display 230 (e.g., provided to user interface 232 of display 230). In some embodiments, communications module 243 may be configured to support spread spectrum transmissions, for example, and/or multiple simultaneous communications channels between elements of system 100.

Other modules 249 of scene imager 240 may include other and/or additional sensors, actuators, communications modules/nodes, and/or user interface devices, for example, and may be used to provide additional environmental information related to operation of scene imager 240, for example. In some embodiments, other modules 249 may include a humidity sensor, a temperature sensor, a barometer, an altimeter, a radar system, a visible spectrum camera or infrared camera (with an additional mount), an irradiance detector, and/or other environmental sensors providing measurements and/or other sensor signals that can be displayed to a user and/or used by other devices of system 200 (e.g., controller 112) to provide operational control of scene imager 240 and/or system 200. In some embodiments, other modules 249 may include one or more actuated and/or articulated devices (e.g., multi-spectrum active illuminators, visible and/or IR cameras, radars, sonars, and/or other actuated devices) coupled to scene imager 240, where each actuated device includes one or more actuators adapted to adjust an orientation of the device, relative to scene imager 240, in response to one or more control signals (e.g., provided by controller 112).

In various embodiments, scene imager 240 may include orientation sensor 244, gyroscope/accelerometer 246, and/or GNSS 248 to provide orientation and/or position data for scene imager 240 (e.g., which may be included in image data provided to threat source mapping server 110). For example, scene imager 240 may be mobile and require such sensor data to properly position and orient its viewpoint relative to scene 190 and/or other scene imagers within imaging system 140. In other embodiments, scene imager 240 may be stationary and either omit orientation sensor 244, gyroscope/accelerometer 246, and/or GNSS 248 (e.g., thereby relying on an installation or calibration orientation and/or position relative to scene 190), for example, or include only one of orientation sensor 244, gyroscope/accelerometer 246, and/or GNSS 248 to differentiate its images from those of other scene imagers.

Orientation sensor 244 may be implemented as one or more of a compass, float, accelerometer, and/or other device capable of measuring an orientation of scene imager 240 (e.g., magnitude and direction of roll, pitch, and/or yaw, relative to one or more reference orientations such as gravity and/or Magnetic North), and providing such measurements as sensor signals that may be communicated as part of threat detection events communicated to other devices of system 100. Gyroscope/accelerometer 246 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of scene imager 240 and providing such measurements as sensor signals that may be communicated as part of threat detection events communicated to other devices of system 100 (e.g., user interface 232, controller 112). GNSS 248 may be implemented according to any global navigation satellite system, including a GPS, GLONASS, and/or Galileo based receiver and/or other device capable of determining absolute and/or relative position of scene imager 240 (e.g., or an element of scene imager 240) based on wireless signals received from space-born and/or terrestrial sources (e.g., eLoran, and/or other at least partially terrestrial systems), for example, and capable of providing such measurements as sensor signals that may be communicated as part of threat detection events communicated to other devices of system 100 (e.g., user interface 232, controller 112). In some embodiments, GNSS 248 may include an altimeter, for example, or may be used to provide an absolute altitude.

In general, each of the elements of systems 100 or 200 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of systems 100 or 200.

In addition, one or more non-transitory mediums may be provided for storing machine readable instructions for loading into and execution by any logic device implemented with one or more of the devices of systems 100 or 200. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of systems 100 or 200 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of systems 100 or 200 may include one or more modules supporting wired, wireless, and/or a combination of wired and wireless communication techniques. In some embodiments, various elements or portions of elements of systems 100 or 200 may be integrated with each other, for example, or may be integrated onto a single printed circuit board (PCB) to reduce system complexity, manufacturing costs, power requirements, coordinate frame errors, and/or timing errors between the various sensor measurements.

Each element of systems 100 or 200 may include one or more batteries, capacitors, or other electrical power storage devices, for example, and may include one or more solar cell modules or other electrical power generating devices. In some embodiments, one or more of the devices may be powered by an external power source, using one or more power leads. Such power leads may also be used to support one or more communication techniques between elements of systems 100 or 200.

Figure 3:
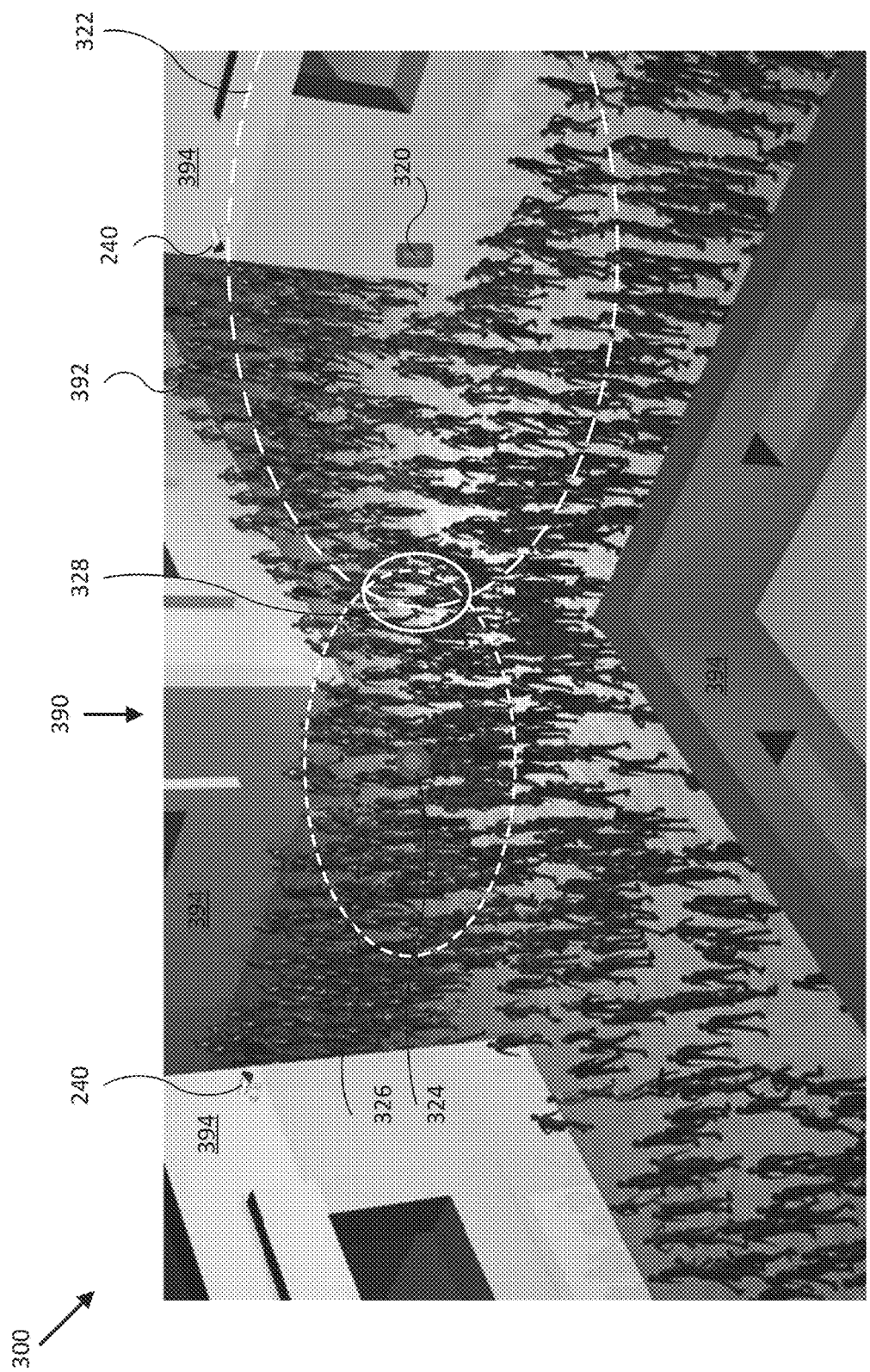
FIG. 3 illustrates a diagram of a threat source mapping system in accordance with an embodiment of the disclosure.

FIG. 3 illustrates a diagram of a threat source mapping system 300 in operation in accordance with an embodiment of the disclosure. As shown in FIG. 3, threat source mapping system 300 includes stationary threat detector 320, mobile threat detector 324, and scene imagers 240 monitoring intersection/scene 390 formed by four buildings 394 and including crowd of people 392. Stationary threat detector 320 is mounted to a wall of one of the four buildings 394 and is able to monitor roughly half the area of interest in scene 390, as shown by perimeter 322 of the roughly spherical sensitivity pattern of stationary threat detector 320 (where perimeter 322 is approximately the intersection of the spherical sensitivity pattern of stationary threat detector 320 and an assumed Height Above Ground corresponding to adult human waist-height for humans 392). Mobile threat detector 324 is mobile within crowd 392 and can monitor roughly $\frac{1}{6}^{th}$ the area of interest in scene 390, as shown by perimeter 326 of the roughly spherical sensitivity pattern of mobile threat detector 324 (where perimeter 326 is approximately the intersection of the spherical sensitivity pattern of mobile threat detector 324 and an assumed Height Above Ground corresponding to adult human waist-height for humans 392).

As shown in FIG. 3, both stationary threat detector 320 and mobile threat detector 324 are actively detecting a threat (e.g., a radiological, chemical, or biological threat) within their sensitivity pattern perimeters 322 and 326. If the time stamps of the two threat detection events reported by stationary threat detector 320 and mobile threat detector 324 are the same, or other characteristics of the two threat detection events indicate they are related to the same threat source, then an overlapping area 328 of the two sensitivity patterns would likely be the position of the threat source. As can clearly be seen from FIG. 3, each threat detector on its own would have a much larger possible position for the threat source (e.g., equal to the perimeters 322 and 326), but when used together, the resolution of the resulting threat source map is increased substantially (e.g., the ratio of the area of overlapping area 328 to the area of perimeter 322 or 326). Thus, increasing the number of threat detectors in the threat sensor network can significantly increase the localization/estimate of the position of the threat source, even though the sensitivity of the individual threat detectors may be relatively poor (e.g., compare perimeter 322, from a relatively expensive and sensitive stationary threat detector, with perimeter 326, from a relatively inexpensive and less sensitive mobile threat detector).

A resulting threat source location heat map (e.g., generated by threat source mapping server 110) would show relatively "cool" areas outside both perimeters, a slight elevation in "temperature" within each perimeter, and a significant elevation in "temperature" in overlapping area 328. A resulting threat source image map (e.g., also generated by threat source mapping server 110) would combine at least aspects of visible and/or infrared imagery of scene 390 supplied by scene imagers 240.

Figure 4:
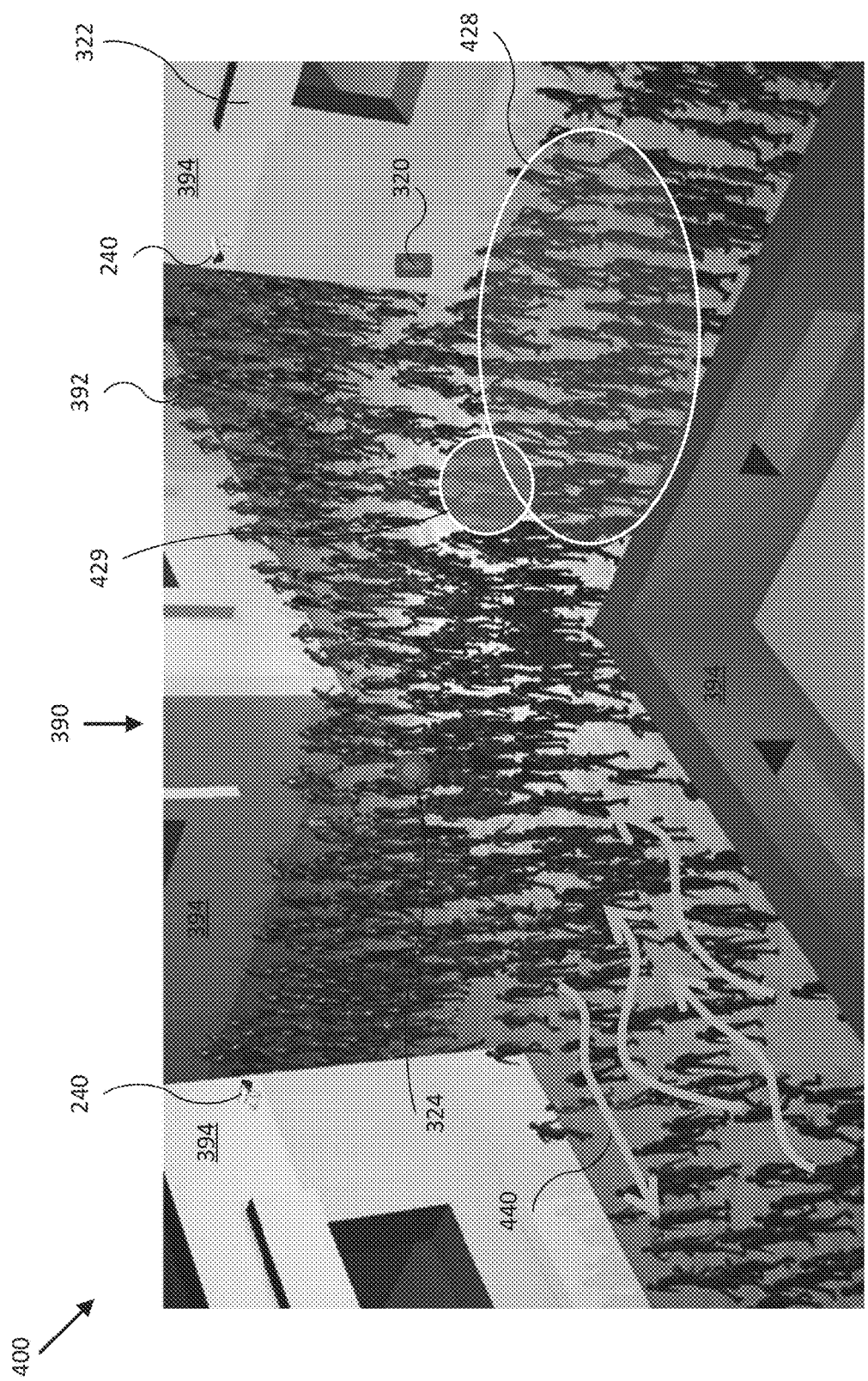
FIG. 4 illustrates a diagram of a threat source mapping system in accordance with an embodiment of the disclosure.

FIG. 4 illustrates a diagram of a threat source mapping system 400 in operation in accordance with an embodiment of the disclosure. Threat source mapping system 400 is similar to threat source mapping system 300 but shows the progression from a single threat detector reporting a threat detecting event to a pair of threat detectors with overlapping sensitivity patterns reporting their respective threat detecting events. Specifically, estimated threat source position/threat zone 428 indicates the area within scene 390 that corresponds to an initial threat detection event reported by stationary threat detector 320. Estimated threat source position/threat zone 429 indicates the much smaller area within scene 390 that corresponds to a combination of subsequent threat detection events reported by stationary threat detector 320 and mobile threat detector 324.

Also shown in FIG. 4 are motion tracks 440 corresponding to detected motion of people within crowd 392. For example, threat source mapping server 110 may be configured to receive a time series of images of scene 390 from one or both of scene imagers 240 and track particular objects, people, clothing, vehicles, and/or other objects within crowd 392 and determine their general motional trends over the time series of images. From such trends, motion tracks 440 may be determined, which can be used to help refine estimated threat source position/threat zone 429. For example, even if mobile threat detector 324 moves far enough away from the threat source that it cannot detect it anymore, prior knowledge of the shape and size of threat zone 429 and motion tracks 440 can help define an updated threat zone still approximately the size of threat zone 429 but further along the path to the upper right of scene 390 and only affirmatively detected by stationary threat detector 320, for example, or further along the path to the lower left of scene 390 and only affirmatively detected by mobile threat detector 324.

Figure 5:
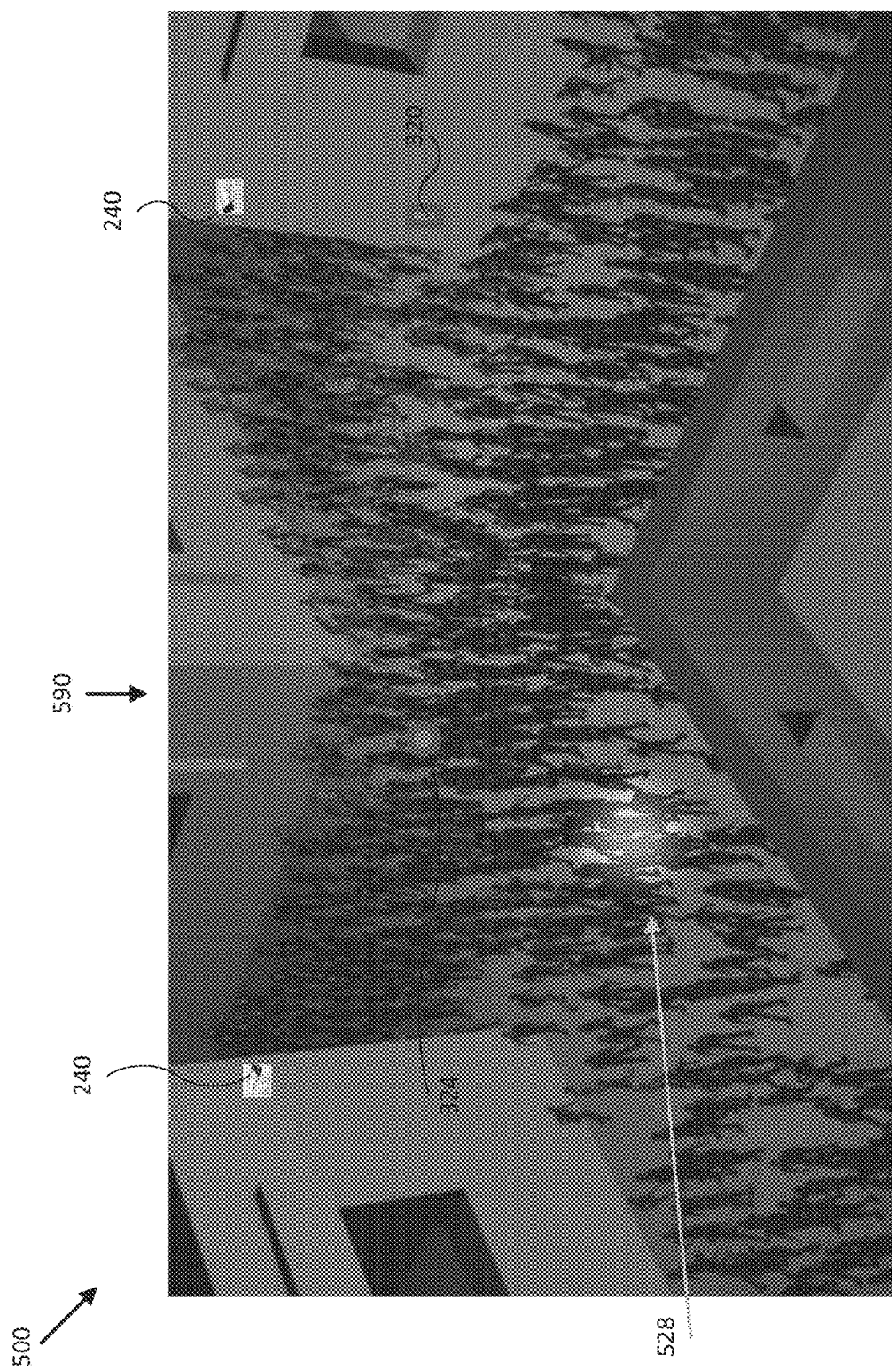
FIG. 5 illustrates a display view of a threat source map generated by a threat source mapping system in accordance with an embodiment of the disclosure.

For example, FIG. 5 illustrates a display view 500 of a threat source image map 590 generated by threat source mapping system 400 in accordance with an embodiment of the disclosure. In FIG. 5, threat source image map 590 includes a relatively small threat zone 528 with a relatively high resolution gradient of threat source position reliability (e.g., represented as hue or alpha in FIG. 5) across the span of threat zone 528, with the rest of threat source image map 590 being approximately the same non-threat-zone hue. In some embodiments, threat source image map 590 may include high frequency content extracted from images provided by scene imagers 240 (e.g., by high pass filtering images from scene imagers 240) combined with a threat source location heat map generated by threat source mapping server 110 based on threat detection events provided by stationary threat detector 320 and mobile threat detector 324, for example, and/or motion tracks derived from images provided by scene imagers 240. Various image combination processing techniques may be used by threat source mapping server 110, including determining a transformation model to register a threat source location heat map to image data of the scene, blending the high frequency content and/or other characteristics of the images with the threat source location heat map, and/or overlaying the threat source location heat map over high frequency content and/or other characteristics of the images. In various embodiments, display view 500 may include icons or computer generated graphics indicating the positions of stationary threat detector 320, mobile threat detector 324, and/or scene imagers 240.

Figure 6:
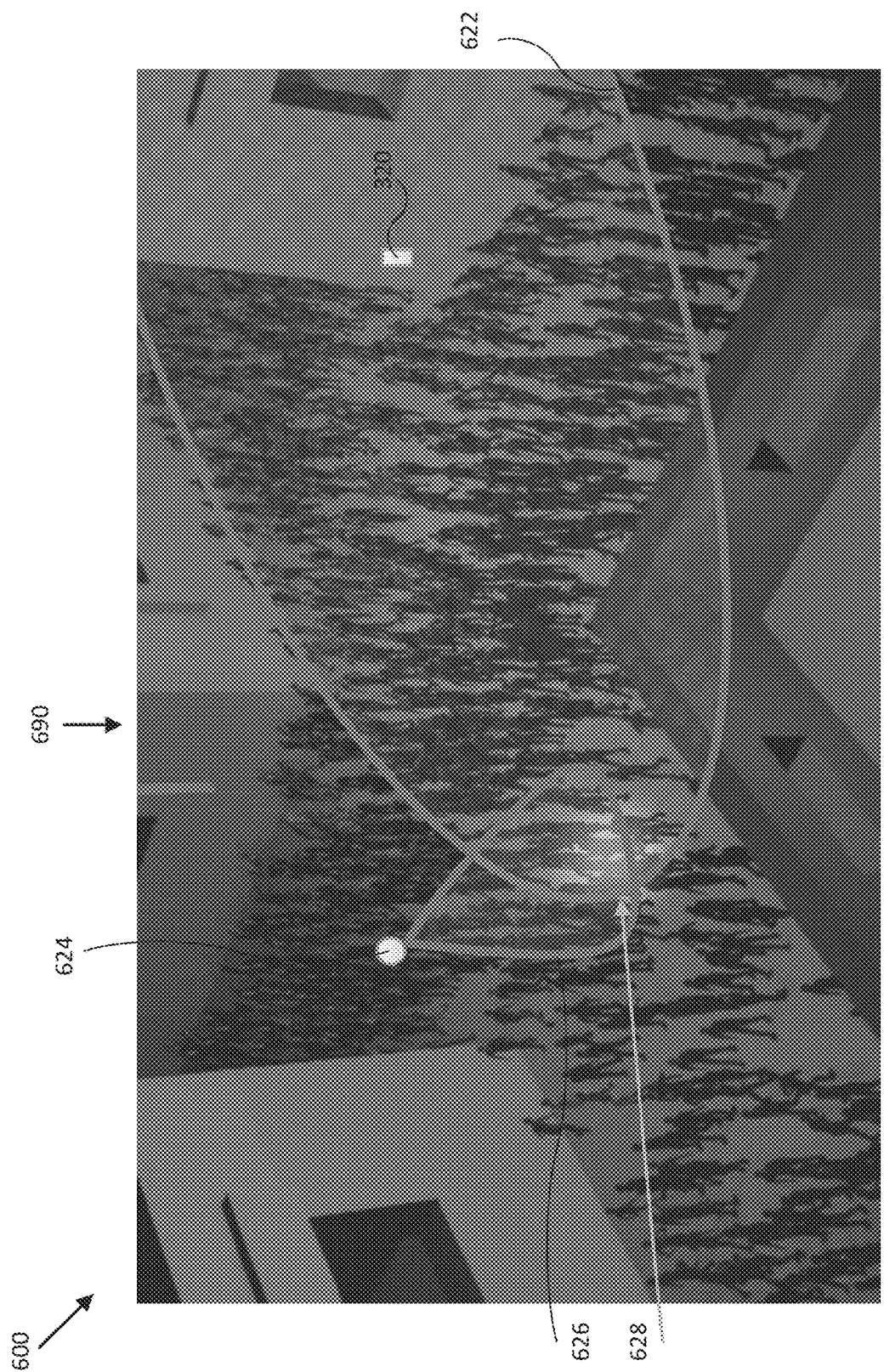
FIG. 6 illustrates a display view of a threat source map generated by a threat source mapping system in accordance with an embodiment of the disclosure.

FIG. 6 illustrates a display view 600 of a threat source image map 690 generated by threat source mapping system 100 in accordance with an embodiment of the disclosure. In FIG. 6, threat source image map 690 is similar to threat source image map 590 and includes a relatively small threat zone 628 with a relatively high resolution gradient of threat source position reliability (e.g., represented as hue or alpha in FIG. 6) across the span of threat zone 628, with the rest of threat source image map 590 being approximately the same non-threat-zone hue. In addition, however, display view 600 shown in FIG. 6 also includes sensitivity pattern perimeter 622 corresponding to stationary threat detector 320 (e.g., with a boosted sensitivity relative to FIGS. 3-5) and sensitivity pattern perimeter 626 corresponding to mobile directional threat detector 624, which indicates to a viewer that the sensitivity pattern of mobile directional threat detector 624 is non-spherical and generally directional. Display view 600 thus provides additional information to help a user viewing display view 600 (e.g., via display 230) interpret threat source image map 690, and, in embodiments where display view 600 is one of a time series of threat source image maps, direct the operator of mobile directional threat detector 624 to keep threat zone 628 within the sensitivity pattern perimeter of mobile directional threat detector 624, for example.

Figure 7:
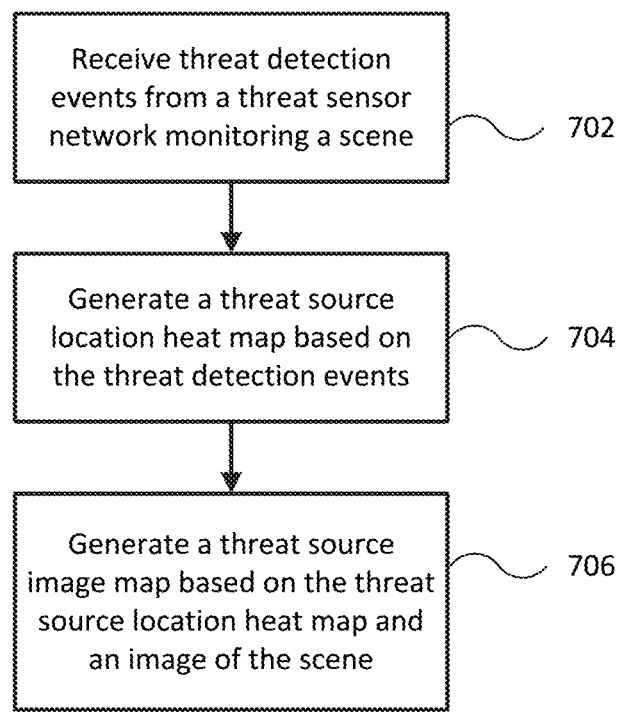
FIG. 7 illustrates a flow diagram of various operations to provide threat source mapping using a threat source mapping system in accordance with an embodiment of the disclosure.

FIG. 7 illustrates a flow diagram 700 of various operations to provide threat source mapping using threat source mapping systems 100, 200, 300, and/or 400 in accordance with an embodiment of the disclosure. In some embodiments, the operations of FIG. 7 may be implemented as software instructions executed by one or more logic devices associated with corresponding electronic devices, sensors, and/or structures depicted in FIGS. 1-4. More generally, the operations of FIG. 7 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 700 may be performed in an order or arrangement different from the embodiments illustrated by FIG. 7. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 700 is described with reference to systems described in FIGS. 1-4, process 700 may be performed by other systems different from those systems and including a different selection of electronic devices, sensors, and/or assemblies.

At block 702, threat detection events are received. For example, controller 112 of threat source mapping server 110 may be configured to receive at least one threat detection event from threat sensor network 120. For example, threat sensor network 120 may include a plurality of threat detectors 220 each configured to monitor at least a portion of scene 190 for any threat detection events. Threat sensor 222 may detect a threat detection event and use communication module 223 to communicate the threat detection event to controller 112 of threat source mapping server 110 via network 101, communication links 151 and 152, and communication module 113. Upon receiving the at least one threat detection event, controller 112 may store the threat detection event in memory 114. In some embodiments, controller 112 may be configured to request an image of scene 190 from scene imager 240 upon receiving the threat detection event. In other embodiments, scene imager 240 may be configured to stream images and/or video of scene 190 to controller 112 and/or other elements of threat source mapping server 110. In various embodiments, threat sensor network 120 includes a stationary threat detector 220, such as radiation detector 320 and a mobile threat detector 220, such as radiation detector 624, where at least one of the stationary threat detector and the mobile radiation detector is implemented as a directional threat detector (e.g., stationary radiation detector 320 and/or mobile radiation detector 624 may be implemented as a directional radiation detector with a substantially non-spherical sensitivity pattern).

At block 704, a threat source location heat map is generated. For example, controller 112 of threat source mapping server 110 may be configured to generate a threat source location heat map (e.g., a portion of threat source image map 590, 690) based, at least in part, on the threat detection events received in block 702. In some embodiments, each threat detection event received in block 702 corresponds to a three dimensional space within scene 190 corresponding to the portion of the scene monitored by one of the one or more threat detectors (e.g., roughly corresponding to a sensitivity pattern of the threat detector/sensor), and controller 112 may be configured to generate the threat source location heat map by generating a three dimensional model of the threat detection events received in block 702.

In one embodiment, the three dimensional model includes three dimensional objects, corresponding to the threat detection events, placed within the three dimensional space within the scene as represented by the three dimensional model, and each three dimensional object includes a surface, shape, and/or volume corresponding to a sensitivity pattern of one of the one or more threat detectors 220. In another embodiment, the three dimensional model includes a three dimensional point cloud corresponding to the threat detection events, placed within the three dimensional space within the scene as represented by the three dimensional model, and the three dimensional point cloud includes a distribution pattern corresponding to a sensitivity pattern of at least one of the one or more threat detectors 220. In a further embodiment, the three dimensional model includes three dimensional objects and/or a three dimensional point cloud corresponding to the threat detection events, placed within the three dimensional space within the scene as represented by the three dimensional model. In such embodiment, a hue, a saturation, a lightness, a value, and/or an alpha of the three dimensional objects or elements of the three dimensional point cloud decreases as a function of distance from a position of the threat detectors corresponding to the threat detection events, varies as a function of detected strength of the threat detection events, and/or varies according to detected types of threat detection events (e.g., to indicate a specific substance of the threat source).

In some embodiments, controller 112 is configured to receive at least one image of scene 190 from imaging system 140 prior to generating the threat source image map in block 706, and sometimes prior to generating the threat source location heat map in block 704. In such embodiments, the at least one image may be a time series of images, such as a video, and controller 112 may be configured to determine at least one motion track of a person or vehicle in the time series of images prior to generating the threat source location heat map, and to generate the threat source location heat map based on the at least one threat detection event and the at least one motion track. For example, a threat source location heat map initially generated by a combination of threat detection events from multiple threat detectors 220 and including a relatively small threat zone 628 may be updated to retain the relatively small threat zone 628 but translated within the threat source location heat map along the motion track, even if most or all the threat detectors 220 can no longer detect the threat source, as described herein.

At block 706, a threat source image map is generated. For example, controller 112 of threat source mapping server 110 may be configured to generate threat source image map 590 or 690 based, at least in part, on the threat source location heat map generated in block 704 and at least one image of scene 190 capture by scene imager 240 that at least partially overlaps the portions of scene 190 (e.g., perimeters 322, 326) monitored by the one or more threat detectors 220 of threat sensor network 120. In some embodiments, controller 112 may be configured to generate the threat source image map by determining a transformation model to register the threat source location heat map to the at least one image of the scene, extracting high frequency content from the at least one image of the scene, and combining the high frequency content from the at least one image of the scene with the threat source location heat map based, at least in part, on the determined transformation model. Once the threat source image map is generated, controller 112 may be configured to communicate the generated threat source image map to display network 130 for display to a user via at least one display 230.

In embodiments where controller 112 is configured to receive the at least one image of the scene from the imaging system prior to generating the threat source image map, controller 112 may be configured to generate the threat source image map by rendering the threat source location heat map according to a viewpoint of the image and/or of the at least one scene imager. Such image may include a visible spectrum image or an infrared image.

By providing such systems and techniques for threat source mapping, embodiments of the present disclosure substantially increase the resolution and ultimate utility of threat source maps, which can be generated by a relatively inexpensive to implement threat sensor network that can include and combine threat detection events from mobile threat detectors as well as stationary threat detectors, as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:
   a threat sensor network comprising two or more threat detectors each configured to monitor at least a portion of a scene for at least one threat detection event; and
   a logic device configured to communicate with the threat sensor network, wherein the logic device is configured to:
   receive the at least one threat detection event from the threat sensor network;
   generate a threat source location heat map based, at least in part, on the at least one threat detection event; and
   generate a threat source image map based, at least in part, on the threat source location heat map and at least one image of the scene that at least partially overlaps the portions of the scene monitored by at least one or more of the threat detectors;
   wherein:
   each threat detection event corresponds to a three dimensional space within the scene corresponding to the portion of the scene monitored by at least one of the two or more threat detectors; and
   a hue, a saturation, a lightness, a value, and/or an alpha of at least one three dimensional object or elements of a three dimensional point cloud, of a three dimensional model of the at least one threat detection event, decreases as a function of distance from a position of the threat detector corresponding to the at least one threat detection event, varies as a function of detected strength of the at least one threat detection event, and/or varies according to a detected type of threat detection event.

2. The system of claim 1, wherein the generating the threat source image map comprises:
   determining a transformation model to register the threat source location heat map to the at least one image of the scene;
   extracting high frequency content from the at least one image of the scene; and
   combining the high frequency content from the at least one image of the scene with the threat source location heat map based, at least in part, on the determined transformation model.

3. The system of claim 1, wherein:
   the generating the threat source location heat map comprises generating the three dimensional model of the at least one threat detection event.

4. The system of claim 3, wherein:
   the three dimensional model comprises the at least one three dimensional object, corresponding to the at least one threat detection event, placed within the three dimensional space within the scene as represented by the three dimensional model; and
   the three dimensional object comprises a surface, shape, and/or volume corresponding to a sensitivity pattern of the one of the two or more threat detectors.

5. The system of claim 3, wherein:
   the three dimensional model comprises the three dimensional point cloud corresponding to the at least one threat detection event, placed within the three dimensional space within the scene as represented by the three dimensional model; and
   the three dimensional point cloud comprises a distribution pattern corresponding to a sensitivity pattern of at least one of the two or more threat detectors.

6. The system of claim 3, wherein:
the three dimensional model comprises the at least one three dimensional object and/or the three dimensional point cloud corresponding to the at least one threat detection event, placed within the three dimensional space within the scene as represented by the three dimensional model.

7. The system of claim 1, further comprising an imaging system comprising at least one scene imager configured to capture the at least one image of the scene, wherein:
the logic device is configured to receive the at least one image of the scene from the imaging system prior to generating the threat source image map;
the generating the threat source image map comprises rendering the threat source location heat map according to a viewpoint of the image and/or of the at least one scene imager; and
the at least one image comprises a visible spectrum image or an infrared image.

8. The system of claim 7, wherein the at least one image comprises a time series of images, and wherein the logic device is configured to:
determine at least one motion track of a person or vehicle in the time series of images prior to generating the threat source location heat map; and
generate the threat source location heat map based on the at least one threat detection event and the at least one motion track.

9. The system of claim 1, further comprising a display network comprising at least one display, wherein:
the logic device is configured to communicate the generated threat source image map to the display network for display to a user via the at least one display;
the threat sensor network comprises a stationary threat detector or a mobile threat detector implemented as an omnidirectional threat detector or a directional threat detector.

10. A system comprising:
a threat sensor network comprising two or more threat detectors each configured to monitor at least a portion of a scene for at least one threat detection event; and
a logic device configured to communicate with the threat sensor network, wherein the logic device is configured to:
receive the at least one threat detection event from the threat sensor network;
generate a threat source location heat map based, at least in part, on the at least one threat detection event; and
generate a threat source image map based, at least in part, on the threat source location heat map and at least one image of the scene that at least partially overlaps the portions of the scene monitored by at least one or more of the threat detectors;
wherein:
the threat sensor network comprises a stationary radiation detector and a mobile radiation detector; and
at least one of the stationary radiation detector and the mobile radiation detector comprises a directional radiation detector with a non-spherical sensitivity pattern.

11. A method comprising:
receiving at least one threat detection event from a threat sensor network comprising two or more threat detectors each configured to monitor at least a portion of a scene for the at least one threat detection event;
generating a threat source location heat map based, at least in part, on the at least one threat detection event; and
generating a threat source image map based, at least in part, on the threat source location heat map and at least one image of the scene that at least partially overlaps the portions of the scene monitored by at least one or more of the threat detectors,
wherein:
each threat detection event corresponds to a three dimensional space within the scene corresponding to the portion of the scene monitored by at least one of the two or more threat detectors; and
a hue, a saturation, a lightness, a value, and/or an alpha of at least one three dimensional object or elements of a three dimensional point cloud, of a three dimensional model of the at least one threat detection event, decreases as a function of distance from a position of the threat detector corresponding to the at least one threat detection event, varies as a function of detected strength of the at least one threat detection event, and/or varies according to a detected type of threat detection event.

12. The method of claim 11, wherein the generating the threat source image map comprises:
determining a transformation model to register the threat source location heat map to the at least one image of the scene;
extracting high frequency content from the at least one image of the scene; and
combining the high frequency content from the at least one image of the scene with the threat source location heat map based, at least in part, on the determined transformation model.

13. The method of claim 11, wherein:
the generating the threat source location heat map comprises generating the three dimensional model of the at least one threat detection event.

14. The method of claim 13, wherein:
the three dimensional model comprises the at least one three dimensional object, corresponding to the at least one threat detection event, placed within the three dimensional space within the scene as represented by the three dimensional model; and
the three dimensional object comprises a surface, shape, and/or volume corresponding to a sensitivity pattern of the one of the two or more threat detectors.

15. The method of claim 13, wherein:
the three dimensional model comprises the three dimensional point cloud corresponding to the at least one threat detection event, placed within the three dimensional space within the scene as represented by the three dimensional model; and
the three dimensional point cloud comprises a distribution pattern corresponding to a sensitivity pattern of at least one of the two or more threat detectors.

16. The method of claim 13, wherein:
the three dimensional model comprises the at least one three dimensional object and/or the three dimensional point cloud corresponding to the at least one threat detection event, placed within the three dimensional space within the scene as represented by the three dimensional model.

17. The method of claim 11, further comprising receiving the at least one image of the scene from an imaging system comprising at least one scene imager configured to capture the at least one image of the scene, prior to generating the threat source image map, wherein:
the generating the threat source image map comprises rendering the threat source location heat map according to a viewpoint of the image and/or of the at least one scene imager; and
the at least one image comprises a visible spectrum image or an infrared image.

18. The method of claim 17, wherein the at least one image comprises a time series of images, and the method further comprising:
determining at least one motion track of a person or vehicle in the time series of images prior to generating the threat source location heat map; and
generating the threat source location heat map based on the at least one threat detection event and the at least one motion track.

19. The method of claim 11, further comprising:
communicating the generated threat source image map to a display network comprising at least one display configured to display the generated threat source image map to a user;
wherein the threat sensor network comprises a stationary threat detector or a mobile threat detector.

20. The method of claim 11, wherein:
the threat sensor network comprises a stationary radiation detector and a mobile radiation detector.

* * * * *